United States Patent [19]
Kobayashi

[11] Patent Number: 4,899,622
[45] Date of Patent: Feb. 13, 1990

[54] AUTOMATIC TRANSMISSION FOR A MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 248,308

[22] Filed: Sep. 19, 1988

Related U.S. Application Data

[63] Continuation-in-part of Ser. No. 52,631, May 20, 1987, abandoned.

[30] Foreign Application Priority Data

May 23, 1986 [JP] Japan .................. 61-119489

[51] Int. Cl.$^4$ .............. F16H 37/08; F16H 35/08; F16H 55/18; F16H 57/02
[52] U.S. Cl. .................. 475/160; 74/400; 74/409; 74/606 R; 475/159; 475/200; 475/204
[58] Field of Search .......... 74/606 R, 400, 409

[56] References Cited

U.S. PATENT DOCUMENTS

| | | | |
|---|---|---|---|
| 1,928,109 | 9/1933 | McCormick | 74/694 |
| 2,022,290 | 11/1935 | Large | 74/400 |
| 3,035,455 | 5/1962 | Péras | 74/700 |
| 3,043,163 | 7/1962 | Hobbs | 74/695 |
| 3,095,764 | 7/1963 | Péras | 74/695 |
| 3,196,696 | 7/1965 | Ritter | 74/687 |
| 3,474,690 | 10/1969 | Lepelletier | 74/695 |
| 3,572,154 | 3/1971 | Bartolomucci | 74/400 |
| 3,648,544 | 3/1972 | Tanaka | 74/695 |
| 4,283,963 | 8/1981 | Hickey et al. | 74/400 |
| 4,309,915 | 1/1982 | Nozawa et al. | 74/606 R |
| 4,400,998 | 8/1983 | Bookout et al. | 74/695 X |
| 4,480,505 | 11/1984 | Takano et al. | 74/869 |
| 4,498,353 | 2/1985 | Kitade | 74/606 R |
| 4,501,167 | 2/1985 | Saito | 74/606 R |

FOREIGN PATENT DOCUMENTS

| | | | |
|---|---|---|---|
| 2308690 | 9/1974 | Fed. Rep. of Germany | 74/606 R |
| 1526585 | 4/1968 | France . | |
| 0065964 | 4/1986 | Japan | 74/606 R |
| 0233564 | 10/1987 | Japan | 74/606 R |

*Primary Examiner*—Rodney H. Bonck
*Assistant Examiner*—Harold F. Macris
*Attorney, Agent, or Firm*—Martin A. Farber

[57] ABSTRACT

An automatic transmission of a trans-axle type in which an input shaft is disposed above a differential across an axle of a vehicle. A case for the transmission is divided into a differential case for mounting a differential and a transmission case for an automatic transmission device. A bearing plate is disposed between the differential case and the transmission case. A drive pinion formed on an end of a drive pinion shaft is engaged with a ring gear of the differential. The drive pinion shaft is rotatably mounted in the bearing plate by a bearing, and an oil pump is provided in the bearing plate around the input shaft.

17 Claims, 4 Drawing Sheets

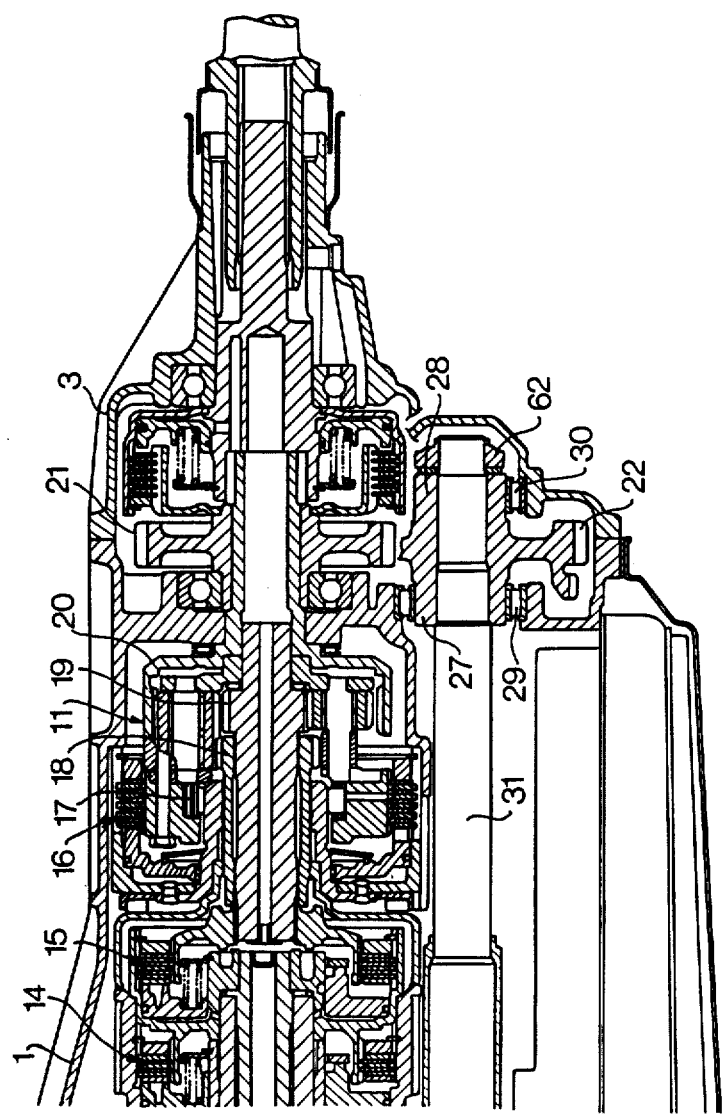

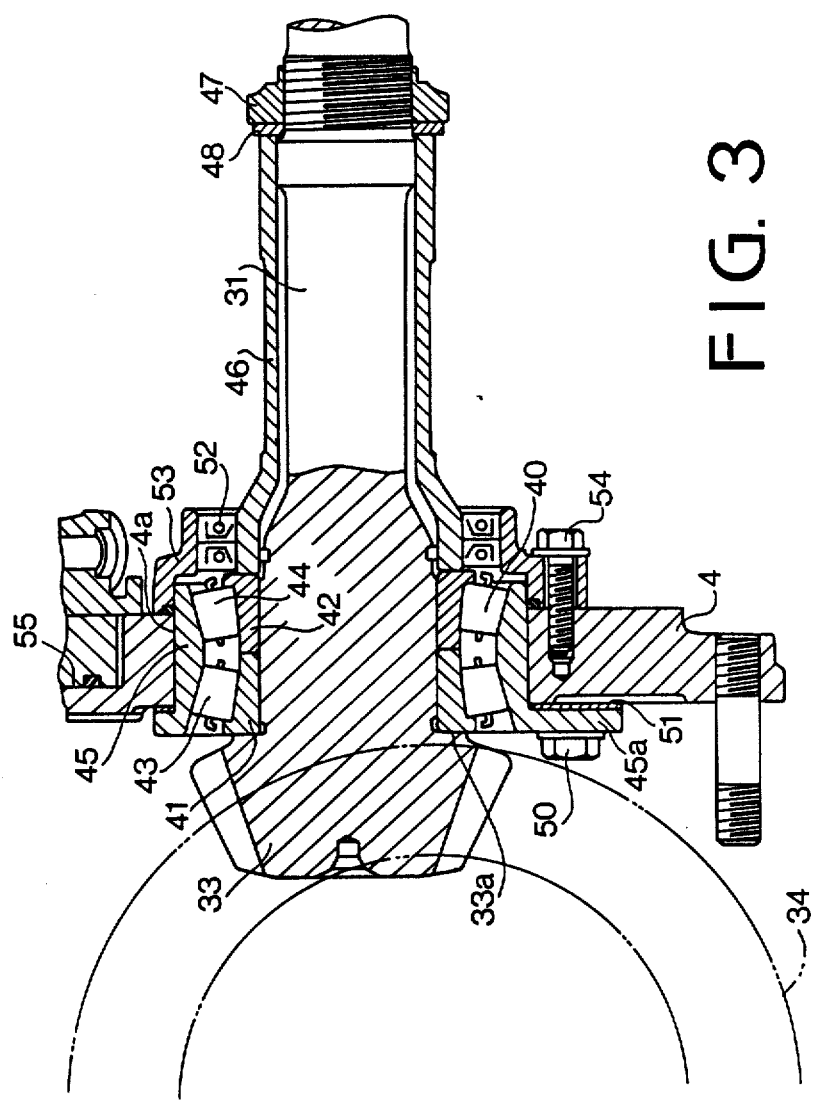

AUTOMATIC TRANSMISSION FOR A MOTOR VEHICLE

RELATED APPLICATION

This a continuation-in-part of my co-pending patent application Ser. No. 052,631, now abandoned, filed May 20, 1987.

BACKGROUND OF THE INVENTION

The present invention relates to an automatic transmission for a motor vehicle, and more particularly to a trans-axle type automatic transmission, an input shaft of which extends across an axle of the vehicle.

An automatic transmission in which an oil pump is disposed in a differential chamber is known. For example, French Patent 1,526,585 discloses an automatic transmission having an oil pump in a differential chamber. However, the differential chamber is expanded in the axial direction for the oil pump. Accordingly, the axial length of the transmission is increased.

SUMMARY OF THE INVENTION

An object of the present invention is to provide a trans-axle type automatic transmission the axial length of which may be reduced.

Another object of the present invention is to provide an automatic transmission which is improved in efficiency of assembling and adjustment of bearings.

Accordingly to the present invention, there is provided an automatic transmission having an automatic transmission device, an input shaft disposed above a differential, a drive pinion shaft disposed in parallel with the input shaft, and a drive pinion formed on an end of the drive pinion shaft being engaged with a ring gear of the differential.

The transmission comprises a differential case for mounting the differential, a transmission case for the automatic transmission device, a bearing plate disposed between the differential case and the transmission case, the drive pinion shaft being rotatably mounted in the bearing plate by a bearing at an end portion adjacent the drive pinion, and an oil pump provided in a recess in the bearing plate around the input shaft.

The other objects and features of this invention will become understood from the following description with reference to the accompanying drawings.

BRIEF DESCRIPTION OF DRAWINGS

FIGS. 1a and 1b show an automatic transmission according to the present invention in section;

FIG. 2 is a sectional view taken along a line II—II of FIG. 1a; and

FIG. 3 is an enlarged view showing a part of FIG. 1a.

DETAILED DESCRIPTION OF THE PREFERRED EMBODIMENT

Figure 1A:
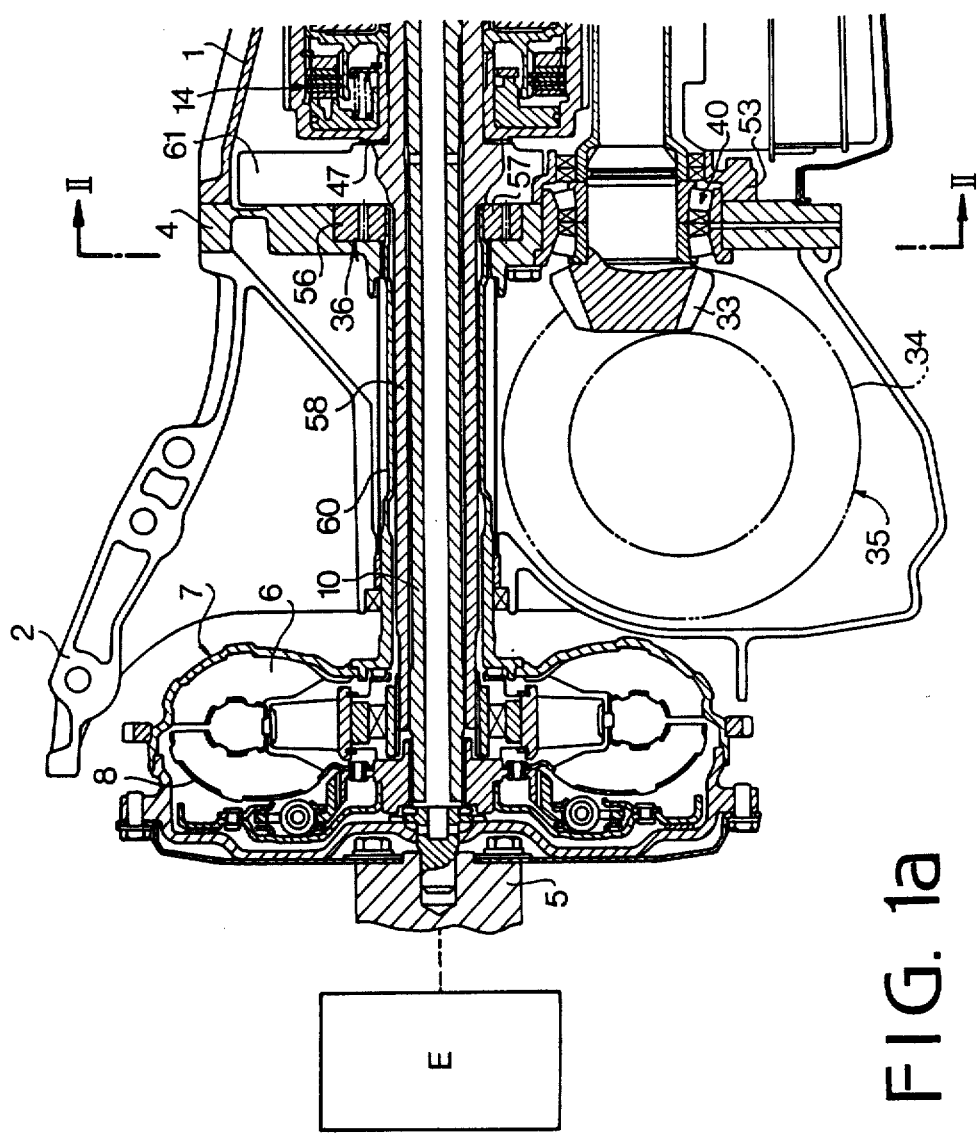
Figure 2:
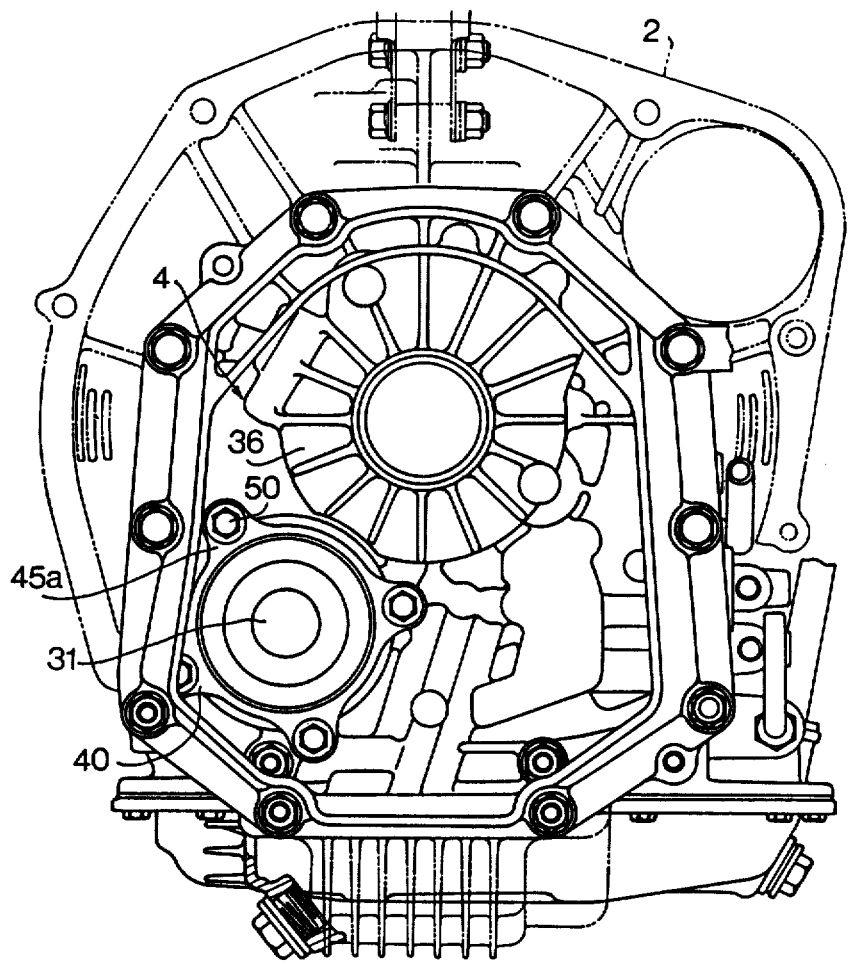

Referring to FIGS. 1 and 2, the automatic transmission has a transmission case 1, a pair of differential covers 2 for forming a differential case secured to an engine block (not shown), and an extension case 3. A bearing plate 4 is disposed between the transmission case 1 and the differential covers 2. A crankshaft 5 of an engine E is connected to an impeller 6 of a torque converter 7. A turbine 8 of the torque converter is connected to an input shaft 10 which is operatively connected to an automatic transmission device 11 in the transmission case 1. The automatic transmission device 11 has a reverse clutch 14, forward clutch 15, low and reverse brake 16, one-way clutch 17, reverse sun gear 18, forward sun gear 19, and ring gear 20. The function and operation of the transmission is well known and is the same as that of U.S. Pat. No. 4,480,505, incorporated by reference herein. The ring gear 20 is connected to a reduction drive gear 21 in the extension case 3. The reduction drive gear 21 is engaged with a reduction driven gear 22 which is secured to a rear portion of a drive pinion shaft 31. The drive pinion shaft 31 is disposed in substantially parallel with the input shaft 10. Opposite bosses 27, 28 of the driven gear 22 are rotatably supported by bearings 29, 30 in the transmission case 1 and extension case 3. A drive pinion 33 at the front end of the drive pinion shaft 31 is engaged with a ring gear 34 of a front differential 35.

In accordance with the present invention, a front portion of the drive pinion shaft 31 is rotatably supported in the bearing plate 4, and further an oil pump 36 for the automatic transmission device 11 is provided in the bearing plate 4, as described hereinafter in detail.

As shown in FIG. 3, a front end portion of the drive pinion shaft 31 is supported by a double taper roller bearing 40. The bearing 40 comprises a front inner race 41 and a rear inner race 42 which are secured to the shaft 31, taper rollers 43, 44, and an outer race 45 engaged with a hole 4a formed in the bearing plate 4. The outer race 45 has a flange 45a at the front side thereof. The inner races 41, 42 are held between a boss 33a of the pinion 33 and a sleeve 46 which is axially secured to the shaft 31 by a nut 47 interposing a washer 48. The flange 45a of outer race 45 is secured to the bearing plate 4 by bolts 50 interposing a shim 51. The roller bearing 40 is sealed by an annular oil seal 52 provided between the sleeve 46 and a retainer 53 secured to the bearing plate 4 by bolts 54.

The oil seal 52 is provided between the adjusting means (comprising the sleeve 46, which is axially adjustably disposed on the shaft 31, and the lock nut 47) and the retainer 53, thereby sealing a partitioning means (comprising the bearing 40, the retainer 53, and the sleeve 46) to hydraulically separate the differential chamber (defined by the differential case) and the transmission chamber (defined by the transmission case 1) from each other.

Different types of lubricating oil, each different type being specially suited and proper for lubricating the respective devices and gears in the differential chamber, on the one hand, and the transmission chamber, on the other hand, are provided and used for lubrication in these two respective chambers. In other words, two different oils suitable for these separate parts of the system can be used in these two chambers, since the different oils do not mix with each other by the seal 52 and the partitioning means which seals and partitions the differential and transmission chambers on both sides of the hole 4a in the bearing plate 4.

The retainer 53 has an enlarged diameter sleeve portion, which engages around a portion of the outer race 45 which extends beyond the bearing plate 4 toward the transmission chamber, abutting the bearing plate 4 with an annular gasket or seal interpositioned against the outer race 45, the bearing plate 4 and the enlarged diameter sleeve portion of the retainer 53. A reduced diameter sleeve portion of the retainer 53 engages around the oil seal 52, which seal 52 comprises oppositely inverted annular seals aligned adjacent the taper rollers 44.

The oil pump 36 is a type of a gear pump provided in a recess 55 formed in the bearing plate 4 at the transmission side. As shown in FIG. 1a, the oil pump 36 is provided around the input shaft 10 and comprises an eccentric outer gear 56 and an inner drive gear 57 coaxial with the input shaft, and a pump cover 61 secured to the bearing plate 4 to hold the gears. The drive gear 57 is connected to the impeller 6 of the torque converter 7 through a sleeve 60. The pump cover 61 has a sleeve 58 disposed between the sleeve 60 and the input shaft 10.

The oil pump 36 supplies hydraulic oil to the automatic transmission device 11 and to the lockup clutch (at the left of the turbine 8 in FIG. 1a) of the torque converter 7 for their operation.

The automatic transmission is assembled in the following manner. The transmission case components and extension case components are preliminarily assembled. The drive pinion shaft 31 is supported by the double taper roller bearing in the bearing plate 4. At that time, the pre-load of the bearing 40 is adjusted by the lock nut 47 (the lock nut 47 being adjustably threaded on cooperating threads on the shaft 31) and by the degree of interference fit of inner races 41, 42 and shaft 31. The position of the drive pinion 33 for the ring gear 34 is adjusted by the number or thickness of the shim or shims 51 to a proper value. The oil pump 36 is assembled in the recess 55 and cover 61 is attached to the bearing plate 4 after adjustment of oil pump members. The bearing plate assembly is attached to the transmission case assembly. The driven gear 22 is mounted on the pinion shaft 31 and supported by bearing 29, and secured by nut 62. The extension case assembly is connected to the transmission assembly supporting the shaft 31 by bearing 30. Therefore, torque converter 7 is operatively connected to the oil pump 36 and automatic transmission device 11. The differential 35 is attached to one of the covers 2 and both covers are secured to the bearing plate, so that the automatic transmission is assembled.

In accordance with the present invention, the oil pump is disposed in the bearing plate for the drive pinion shaft. Accordingly, the oil pump can be mounted in the transmission without providing a special space. Thus, the axial length and the weight of the automatic transmission can be reduced. Since the transmission case assembly and the torque converter case assembly are separately assembled, productivity of the transmission can be improved. The adjustment of the bearing of the drive pinion can be easily performed without obstacles.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In an automatic transmission having an automatic transmission device, an oil pump for supplying hydraulic oil to the automatic transmission device, an input shaft mounted on the transmission device operatively connected with a crankshaft of an engine through a torque converter, a differential mounted between the torque converter and the transmission device and below the input shaft, a ring gear provided on the differential, and a drive pinion shaft provided on the transmission device forming a drive pinion gear engaging with the ring gear to transmit an output of the transmission device to the differential, the improvement of the system comprising:

a differential case defining a differential chamber for mounting the differential and adapted for containing oil for lubricating said differential;

a transmission case defining a transmission chamber for mounting the automatic transmission device and adapted for containing other oil to lubricate the automatic transmission device;

bearing means for rotatably mounting said drive pinion shaft and including a pair of inner races secured to the drive pinion shaft, an adjustable outer race forming a flange member, and rollers disposed between said inner and outer races;

bearing plate means for securing said differential case and the transmission case and forming a recess and an opening to mount said oil pump and said bearing means therein respectively;

adjusting means mounted on the drive pinion shaft for adjusting the inner races;

partitioning means for providing a partitioning between said differential and transmission chambers and comprising said bearing means, said adjusting means and a retainer secured to the bearing means; and sealing means mounted between said adjusting means and said retainer adapted for sealing off said oil and the other oil to prevent mixing of said oils with each other, so as to enable appropriate lubrication of said differential and transmission device, respectively.

2. The automatic transmission according to claim 1, further comprising an extension case securable to a side of the transmission case remote from said differential case.

3. The automatic transmission according to claim 1, wherein
the bearing means for the drive pinion shaft is a double taper roller bearing.

4. The automatic transmission according to claim 2, wherein
an end portion of the drive pinion shaft is rotatably supported in the transmission case and the extension case.

5. The automatic transmission according to claim 1, wherein
said recess opens towards the transmission case.

6. The automatic transmission according to claim 2, wherein
said pump includes an eccentric outer gear and an inner drive gear coaxial to said input shaft, and
a pump cover in the transmission case secured to the bearing plate means holding said gears and having a sleeve extending into the differential case and disposed coaxially between the input shaft and a drive sleeve connected to the inner drive gear.

7. The automatic transmission according to claim 1, wherein
said pump is completely located in said recess.

8. The automatic transmission according to claim 1, wherein
the bearing plate means, the drive pinion shaft, the partitioning means and the oil pump comprise a primary unit of assembly mountable to the transmission case and differential case.

9. The transmission according to claim 1, further comprising shim means adjustably disposed between the flange member of the outer race of the bearing means and the bearing plate means for adjusting an engaging position of the drive pinion gear and ring gear in a direction parallel to the axial direction of the drive pinion shaft, and a bolt for securing the flange member of the outer race to the bearing plate means.

10. The automatic transmission according to claim 8, wherein
said recess faces the transmission case.

11. The device according to claim 1, further comprising
bolts, and
said retainer is secured to said bearing means by said bolts attaching said retainer to said bearing plate means, said retainer being disposed in said transmission chamber and having an enlarged diameter sleeve portion engaging about a portion of said outer race extending beyond said bearing plate means and a reduced diameter sleeve portion engaging about said sealing means.

12. The device according to claim 1, wherein
said adjusting means is disposed in said transmission chamber and comprises a sleeve axially displaceably disposed on said drive pinion shaft and abutting one of said inner races and a lock nut for adjusting and axially locking the position of the sleeve on said drive pinion shaft,
the other of said inner races engages a boss of the drive pinion gear.

13. The device according to claim 1, further comprising
means for attaching said flange member to said bearing plate means.

14. The device according to claim 11 further comprising
means for attaching said flange member to said bearing plate means.

15. In an automatic transmission having an automatic transmission device, an oil pump for supplying hydraulic oil to the automatic transmission device, the latter having an input shaft for operatively connecting with a crankshaft of an engine through a torque converter, a differential mounted between the torque converter and the automatic transmission device and below the input shaft, the differential having a ring gear, and a drive pinion shaft as an output member of the transmission device having a drive pinion gear engaging thereon with the ring gear, the improvement comprising, a differential case forming a differential chamber mounting said differential and adapted for containing oil for lubricating said differential,
a transmission case forming a transmission chamber for mounting said automatic transmission device and adapted for containing other oil to lubricate the automatic transmission device,
bearing means for rotatably mounting said drive pinion shaft and including a pair of inner races comprising a front inner race and a rear inner race secured to the drive pinion shaft, an outer race forming a flange member at a side thereof facing the differential case, and rollers disposed between said pair of inner races and said outer race,
bearing plate means for partitioning and securing said differential case and said transmission case and being formed with openings and a recess for mounting said oil pump in said recess and said bearing means in one of said openings,
shim means provided between said bearing plate means and said flange member of the outer race for adjusting an engaging position of the drive pinion gear with the ring gear in axial direction of the drive pinion shaft,
adjusting means comprising sleeve means mounted on the drive pinion shaft for adjusting the inner races,
partitioning means for providing a partitioning between said differential and transmission chambers and comprising said bearing means, said adjusting means and a retainer secured to the bearing means, and
oil sealing means mounted between said adjusting means and said retainer adapted for sealing off said oil and the other oil to prevent mixing of said oils with each other, so as to enable appropriate lubrication of said differential and transmission device, respectively.

16. The device according to claim 15, wherein
bolts, and
said retainer is secured to said bearing means by said bolts attaching said retainer to said bearing plate means, said retainer being disposed in said transmission chamber and having an enlarged diameter sleeve portion engaging about a portion of said outer race extending beyond said bearing plate means and a reduced diameter sleeve portion engaging about said sealing means.

17. The transmission according to claim 15, further comprising
a bolt for securing said flange member of the outer race to the bearing plate means.

* * * * *